March 5, 1968  H. LESSOFF  3,372,122
VANADIUM-CONTAINING LITHIUM FERRITES
Filed Aug. 13, 1964

INVENTOR.
HOWARD LESSOFF
BY
W.S. Hill
AGENT ptions of vanadium in the above described compositions. The incorporation of vanadium in these compositions does not reduce either the Curie temperature or the squareness of the core.

United States Patent Office 3,372,122
Patented Mar. 5, 1968

3,372,122
VANADIUM-CONTAINING LITHIUM FERRITES
Howard Lessoff, Needham Heights, Mass., assignor to Radio Corporation of America, a corporation of Delaware
Filed Aug. 13, 1964, Ser. No. 389,419
13 Claims. (Cl. 252—62.61)

ABSTRACT OF THE DISCLOSURE

Magnetic memory cores useful in computer applications comprise lithium ferrites with minor additions of vanadium. Optionally, manganese, cadmium zinc and/or magnesium may be present. The cores have square hysteresis loop and a high Curie temperature. The addition of vanadium imparts a shorter switching time and/or lower coercive force to the core. The cores are prepared by calcining in an oxidizing atmosphere a mixture of the constituent metal oxides or compounds which yield the constituent metal oxides on heating. The calcined mixture is then shaped to form a core which is sintered at temperatures between 930° C. and 1190° C. and then cooled.

---

Figure 1:
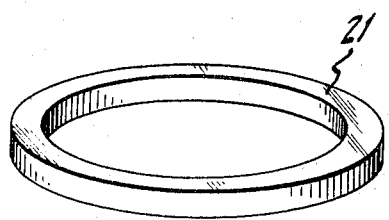

This invention relates to an improved magnetic ferrite core which exhibits a substantially square hysteresis loop and a relatively high Curie temperature. The invention relates also to a method of manufacture thereof. The magnetic ferrite core of the invention may be used as an element in coincident current memories of digital electronic computers and in other electronic apparatus. The terms "core" and "body" are used interchangeably in this document to refer to a sintered mass of ferrite particles.

Previously, magnetic ferrite cores have been described which exhibit a substantially square hysteresis loop (squareness ratio $R_s$ of at least 0.70) and a relatively high Curie temperature (greater than 590° C.). Such high Curie temperature cores are desirable particularly in applications where there is a high ambient temperature. In many cases, the use of such cores obviates the need for heat removal and temperature controlling auxiliary equipment.

Further improvements to these high Curie temperature cores are desirable particularly in providing a core which exhibits a shorter switching time $t_s$ (time interval required to reverse the direction of remanent magnetization in the core) and/or requires less drive current (current used to reverse the direction of magnetization of the core). These characteristics are related to one another. Generally, the greater the drive current used, the shorter the switching time. In combination, these characteristics are important factors in determining the power required to operate the electronic apparatus and the information handling capacity of the apparatus in which the cores are incorporated.

An object of this invention is to provide an improved magnetic ferrite body.

Another object is to provide a method for fabricating the improved magnetic ferrite body of the invention.

A further object is to provide a substantially square magnetic hysteresis loop, high Curie temperature, magnetic ferrite core which has a shorter switching time and/or requires a smaller drive current than previous cores of this type.

In general, the improved magnetic core of the invention has the molar composition $Li_{0.5}Mn_wMe_xV_zFe_yO_4$, where Me is at least one member of the group consisting of Cd, Zn, and Mg, $w$ is between 0.00 and 0.05, $x$ is between 0.00 and 0.05, $y$ is between 2.35 and 2.60, and $z$ is between 0.005 and 0.04. The objects of the invention are achieved particularly by the incorporation of small pro- The magentic core of the invention may be formed by first calcining in an oxidizing atmosphere at temperatures between 600 and 900° C. a mixture of compounds containing, in the following relative molar proportions, 0.5 mol Li, 0.00 to 0.15 mol Mn, 2.35 to 2.60 mol Fe, 0.005 to 0.04 mol V and 0.00 to 0.05 mol of at least one member of the group consisting of Cd, Zn, and Mg. Then a quantity of the calcine is shaped to form a core, and the core is sintered at temperatures between 930 and 1190° C. in an atmosphere which consists essentially of oxygen gas and between 0 and 99 volume percent of at least one neutral gas. The core is then cooled. The incorporation of vanadium in the above described composition permits cores thereof to be sintered at lower temperatures than similar previous cores without vanadium.

Figure 2:
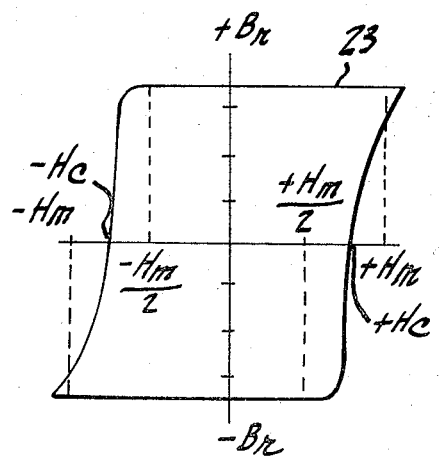

A more detailed description of the invention and illustrative embodiments thereof appear below with reference to the drawing in which:

FIGURE 1 is a typical magnetic core of the invention in the shape of a toroid, and FIGURE 2 is a hysteresis loop for a typical toroidal magnetic core of the invention.

*Example 1.*—A magnetic core of the invention may be prepared by the following procedure. Mix a batch of the following ingredients:

| Ingredient: | Molar parts |
|---|---|
| Li, as lithium carbonate $Li_2CO_3$, CP powder | 0.5 |
| Mn, as manganese carbonate $MnCO_3$, reagent grade | 0.04 |
| V, as vanadium oxide $V_2O_3$, reagent grade | 0.01 |
| Fe, as iron oxide $Fe_2O_3$ | 2.45 |

The batch is attrited in ethyl alcohol for about two hours and then dried and screened. The attrited mixture is calcined for about four hours in air at about 800° C. The calcined batch is attrited in ethyl alcohol for about two hours and then dried. About three percent by weight of a suitable organic binder is evenly dispersed through the dry calcined batch. One suitable binder is Flexalyn (an ethylene glycol ester of rosin) in methyl ethyl ketone, which is marketed by the Hercules Powder Company, Wilmington, Del. The calcined batch with the binder added is screened through an 80 mesh screen. Quantities of the screened calcined batch are then pressed into torodial cores. The pressed cores are then sintered for about 8 hours at about 1100° C. in an atmosphere of pure dry oxygen. The sintered cores are cooled to about 1000° C. and annealed for about four hours at this temperature in an atmosphere containing oxygen gas. After annealing, the cores are cooled to room temperature in the annealing atmosphere.

*Example 2.*—A magnetic core of the invention may be prepared by the following procedure. Mix a batch of the following ingredients:

| Ingredient: | Molar parts |
|---|---|
| Li, as lithium carbonate $Li_2CO_3$ | 0.5 |
| Cd, as cadmium oxide CdO | 0.04 |
| V, as vanadium oxide $V_2O_3$ | 0.01 |
| Fe, as ferric oxide, $Fe_2O_3$ | 2.45 |

The batch is mixed, calcined, and formed into a core as described in Example 1. The pressed cores are then sintered for about 8 hours at about 1125° C. in a atmosphere of pure dry oxygen gas. The sintered cores are cooled at the rate of about 50° C. per hour in an atmosphere of flowing oxygen to about 700° C. and then cooled to room temperature.

FIGURE 1 illustrates a toroidal core 21 prepared according to the examples. A typical sintered toroidal core, whose dimensions are indicated as 50/30/10, has an outside diameter of about 50 mils, an inside diameter of about 30 mils, and a thickness of about 10 mils. However, the toroids may be made in other sizes.

FIGURE 2 illustrates a typical hysteresis loop exhibited by a core prepared according to examples. In FIGURE 2, magnetization B is plotted against magnetizing force H. The value $H_m$ is the magnitude of the applied field. The squareness $R_s$ of the core is defined as the ratio of B at $-H_m/2$ to B at $+H_m/2$.

At least the following compositional and procedural variations may be made from that set forth in the examples. The range of molar composition of the cores of the invention is: $Li_{0.5}Mn_wMe_xV_zFe_yO_4$, where Me is at least one member of the group consisting of Cd, Zn, and Mg. Me may consist of any combination of members of this group. The value of $w$ may be between 0.00 and 0.15. The value of $x$ may be between 0.00 and 0.05. The value of $y$ may be between 2.35 and 2.60. The value of $z$ may be between 0.005 and 0.04.

The batch may be compounded of the constituent metal oxides or of compounds which yield the constituent metal oxides by chemical reaction during the calcining of the batch or during the sintering of the core. Typical compounds may be, for example, carbonates, oxides, or acetates of the constituent metals. A high degree of purity is desirable, preferably the "chemically pure" grade of chemicals.

In the examples, the steps of mixing, attriting, drying, and screening are designed to provide an intimate mixture of the ingredients, and to remove gases, water, and volatile organic matter contained in the batch. These steps are not critical. Any procedure which provides a dry, intimate mixture of the ingredients is satisfactory.

In the example, the calcining step is important. The calcining temperature may be between 600° and 900° C., but is preferably near the middle of the range. The calcining time is not critical, although shorter times are preferred with higher calcining temperatures. Air is the preferred calcining atmosphere. Other atmospheres having oxidizing characteristics similar to that of air at the calcining temperature may also be used.

In the examples, attriting the calcine, addition of a binder, screening, and pressing are not critical to the magnetic properties of the final product; however, a proper selection should be made to obtain the desired shape and size of product with a minimum distortion. The cores may be formed by pressing a powder in a die, by punching from unsintered sheets of resin-bound powder, produced by extrusion or doctor blading, or by any other forming process. Besides toroidal cores, other shapes may be made, including multiaperture magnetic cores, such as magnetic memory aperture plates and transfluxor cores. See a description of ferrite core fabrication processes in G. S. Hipskind et al., "Processing and Testing Rectangular Loop Cores," RCA Engineer, volume II, No. 6, 1957, pages 9 to 13.

The sintering temperature may be between 930° C. and 1190° C. The sintering temperature affects the coercivity of the core and grain size of the crystallites which constitute the core. Generally, the higher the sintering temperature, the lower the coercivity of the core and the larger the grain size of the crystallites. Using the process of Example 2, cores may be made having a coercivity between 1.2 and 6.2 oersteds by selecting the sintering temperature between 930° C. and 140° C.

The sintering time may be between 1 and 24 hours. The sintering time also affects the coercivity of the cores. Generally, the longer the sintering time, the lower the coercivity of the core. Using the process of Example 2, cores may be made having a coercivity between 1.2 and 6.2 oersteds by selecting the sintering time between 1 and 16 hours.

Annealing takes place during cooling at temperatures between 700° and 1100° C. The annealing time may be between 1 and 10 hours. The cooling rate of the core down to 700° C. affects the squareness ratio of the core. Generally, the faster the cooling rate, the lower the squareness ratio $R_s$. Using the process of Example 2, the squareness ratio $R_s$ of the cores may be selected by adjusting the cooling rate between 50° C. per hour and quenching.

The sintering atmosphere and the annealing atmosphere are important. The cores may be sintered in an atmosphere consisting essentially of oxygen gas or a mixture of a neutral gas and oxygen gas. In the sintering atmosphere, the volume ratio of neutral gas to oxygen gas may be between a ratio of 0/1 and a ratio of 99/1. The cores may be annealed in an atmosphere consisting essentially of a mixture of a neutral gas and oxygen gas or of oxygen gas alone. In the annealing atmosphere, the volume ratio of neutral gas to oxygen may be between a ratio of 0/1 and a ratio of 6/1. Some suitable neutral gases for both the sintering step and the annealing step are nitrogen, argon, neon, helium, and mixtures thereof.

Alternative to carrying out the sintering and annealing in one firing operation as described above, the cores described herein may be prepared by sintering in an atmosphere as described above, cooling to room temperature, then refiring in an atmosphere as described above to anneal the cores, and finally cooling again to room temperature. Magnetic cores with similar characteristics to those of the cores of the examples are produced by this two-fire process.

Tables 1 and 2 tabulate some of the properties of some exemplary cores embodying the invention. Table 1 has the following data composition; coercive force $H_c$ in oersteds, and squareness ratio $R_s$. Table 1 tabulates examples of cores prepared by the method of Example 1, but differing from one another only in composition. The first item in Table 1 contains no vanadium and is included for comparison purposes. The other cores of Table 1 exhibit a lower coercive force $H_c$ and therefore require a lower drive current $I_m$ with little or no sacrifice in the other properties set forth. The Curie temperature $T_c$ is above 590° C. for all of the cores. An additional advantage is that the magnetic properties for the cores do not vary appreciably between about −50° C. and 200° C. Furthermore, these cores may be used at temperatures up to 500° C. with suitable adjustment in the drive current. This range is to be compared with many memory cores now in commercial use where the useful operating temperature range is between 0° C. and 100° C.

Table 2 tabulates examples of cores prepared by the method of Example 1 but differing in sintering temperature and/or time and Tables 3 and 4 demonstrate that cores containing vanadium exhibit shorter switching times and/or require lower drive currents than previous cores consisting principally of lithium ferrite. These two characteristics are related to one another. Generally, the higher the drive current, the shorter the switching time. For comparing the switching time of similar sized cores, the drive current should be comparable. For comparing the drive current of similar-sized cores, the switching time should be comparable.

Table 3 compares the drive current $I_m$ (in milliamperes) of various toroidal cores having different compositions, whose dimensions are 30/18/10. The cores were tested with pulses having a rise time of 0.1 microsecond, and the drive currents (in milliamperes) were adjusted to give comparable switching times $t_s$ and peaking times $t_p$ (in microseconds). The cores including vanadium require substantially lower drive currents for comparable switching times than previous cores composed principally of lithium ferrite.

Table 4 compares the switching times $t_s$ (in microseconds) of the same cores as in Table 3, with pulses of comparable drive currents of about 600 ma. (milliamperes) and comparable rise times of about 0.1 μsec.

(microsecond). At comparable drive currents, the cores incorporating vanadium, switch in substantially shorter times than previous cores composed principally of lithium ferrite.

Table 5 compares the drive current $I_m$ of certain cores incorporating vanadium with cores composed principally of magnesium manganese ferrite. The testing conditions were the same as for the data in Table 3, with the drive current $I_m$ in ma. adjusted to give comparable switching times $t_s$. The drive current is comparable at comparable switching times for these cores. However, the cores incorporating vanadium have the additional advantage of being operative at higher temperatures and over a longer operating temperature range. The useful temperature range for the cores incorporating vanadium is between about $-50°$ C. and $+500°$ C., whereas the useful temperature range, for cores consisting principally of magnesium manganese ferrites is between about $0°$ and $+100°$ C.

TABLE 1

[$Li_{0.5}Mn_wMe_xV_zFe_yO_4$]

| w | Me | x | y | z | Hc | Rs |
|---|---|---|---|---|---|---|
| .05 | | | 2.46 | .00 | 2.5 | .82 |
| .04 | | | 2.45 | .01 | 1.4 | .91 |
| .03 | | | 2.45 | .02 | 2.0 | .78 |
| .00 | Cd | .04 | 2.45 | .01 | 1.6 | .98 |
| .00 | Cd | .02 | 2.45 | .01 | 2.1 | .86 |
| .00 | | | 2.46 | .04 | 1.8 | .70 |
| .02 | Cd | .02 | 2.45 | .01 | 1.3 | .79 |

TABLE 2

[$Li_{0.5}Mn_{0.04}V_{0.01}Fe_{2.47}O_4$]

| Sintering Temperature (° C.) | Sintering Time, hrs. | Hc | Rs |
|---|---|---|---|
| 1,050 | 8 | 2.35 | .87 |
| 1,100 | 8 | 2.31 | .84 |
| 1,125 | 8 | 2.20 | .81 |
| 1,140 | 8 | 2.09 | .86 |
| 1,190 | 8 | 1.40 | .91 |
| 940 | 4 | 6.30 | .72 |

TABLE 3

| Molar Composition | $I_m$ (ma.) | $t_p$ (μsec.) | $t_s$ (μsec.) |
|---|---|---|---|
| $Li_{0.5}Mn_{0.05}Fe_{2.45}O_4$ | 1,000 | 0.26 | 0.48 |
| $Li_{0.5}Mn_{0.04}Mo_{0.01}Fe_{2.45}O_4$ | 800 | 0.25 | 0.48 |
| $Li_{0.5}Mn_{0.04}V_{0.01}Fe_{2.45}O_4$ | 600 | 0.27 | 0.44 |

TABLE 4

| Molar Composition | $t_p$ (μsec.) | $t_s$ (μsec.) |
|---|---|---|
| $Li_{0.5}Mn_{0.05}Fe_{2.45}O_4$ | 0.26 | 0.73 |
| $Li_{0.5}Mn_{0.04}Mo_{0.01}Fe_{2.45}O_4$ | 0.32 | 0.60 |
| $Li_{0.5}Mn_{0.04}V_{0.01}Fe_{2.45}O_4$ | 0.27 | 0.44 |

TABLE 5

| Molar Composition | $I_m$ (ma.) | $t_p$ | $t_s$ |
|---|---|---|---|
| $Mg_{0.56}Mn_{0.44}Fe_2O_4$ | 1,000 | 0.14 | 0.25 |
| $Mg_{0.56}Mn_{0.44}Fe_2O_4$ | 800 | 0.16 | 0.28 |
| $Li_{0.5}Mn_{0.04}V_{0.01}Fe_{2.45}O_4$ | 1,000 | 0.16 | 0.26 |
| $Li_{0.5}Mn_{0.04}V_{0.01}Fe_{2.45}O_4$ | 800 | 0.16 | 0.29 |

What is claimed is:

1. A method of making a magnetic core comprising the steps of calcining in an oxidizing atmosphere at temperatures between 600° and 900° C. a mixture of compounds containing, in the following relative molar proportions 0.5 mol Li, 0.0 to 0.15 mol Mn, 2.35 to 2.60 mol Fe, 0.005 to 0.04 mol V, and 0.00 to 0.05 mol of at least one member of the group consisting of Cd, Zn, and Mg, said compounds comprising the constituent metals as oxides thereof or as compounds which yield said oxides during calcining or sintering shaping a quantity of said calcined mixture to form a core, sintering said core at temperatures between 930° and 1190° C. for between 1 and 24 hours in an atmosphere consisting essentially of oxygen gas and between 0 and 99 volume percent of at least one neutral gas, and then cooling said core.

2. A method of making a magnetic core comprising the steps of calcining in an oxidizing atmosphere at temperatures between 600° and 900° C. a mixture of compounds containing, in the following relative molar proportions, 0.5 mol Li, 0.0 to 0.15 mol Mn, 2.35 to 2.60 mol Fe, 0.005 to 0.04 mol V, and up to 0.05 mol Cd, said compounds comprising the constituent metals as oxides thereof or as compounds which yield said oxides during calcining or sintering shaping a quantity of said calcined mixture to form a core, sintering said core at temperatures between 930° and 1190° C., for between 1 and 24 hours in an atmosphere consisting essentially of oxygen gas and between 0 and 99 volume percent of at least one neutral gas, and then cooling said core, said core having a squareness ratio of at least 0.7.

3. A method of making a magnetic core comprising the steps of calcining in an oxidizing atmosphere at temperatures between 600° and 900° C. a mixture of compounds containing, in the following relative molar proportions, 0.5 mol Li, up to 0.15 mol Mn, 2.35 to 2.60 mol Fe, 0.005 to 0.04 mol V, said compounds comprising the constituent metals as oxides thereof or as compounds which yield said oxides during calcining or sintering shaping a quantity of said calcined mixture to form a core, sintering said core at temperatures between 930° and 1190° C., for between 1 and 24 hours in an atmosphere consisting essentially of oxygen gas and between 0 and 99 volume percent of at least one neutral gas, and then cooling said core, said core having a squareness ratio of at least 0.7.

4. A method of making a magnetic core comprising the steps of calcining in an oxidizing atmosphere at temperatures between 600° and 900° C. a mixture of compounds containing, in the following relative molar proportions, 0.5 mol Li, 2.35 to 2.60 mol Fe, 0.005 to 0.04 mol V, and up to 0.05 mol Cd, said compounds comprising the constituent metals as oxides thereof or as compounds which yield said oxides during calcining or sintering shaping a quantity of said calcined mixture to form a core, sintering said core at temperatures between 930° and 1190° C. for between 1 and 24 hours in an atmosphere consisting essentially of oxygen gas and between 0 and 99 volume percent of at least one neutral gas, and then cooling said core, said core having a squareness ratio of at least 0.7.

5. A magnetic core having the molar composition:

$$Li_{0.5}Mn_wMe_xV_zFe_yO_4$$

where:
Me is at least one member of the group consisting of Cd, Zn, and Mg
w is between 0.00 and 0.15
x is between 0.00 and 0.05
y is between 2.35 and 2.60
z is between 0.005 and 0.04.

6. A magnetic core having a squareness ratio $R_s$ of at least 0.7 and the molar composition:

$$Li_{0.5}Me_xV_zFe_yO_4$$

where:
Me is at least one member of the group consisting of Cd, Zn, and Mg
x is between 0.00 and 0.05
y is between 2.35 and 2.60
z is between 0.005 and 0.04.

7. A magnetic core having a squareness ratio $R_s$ of at least 0.7 and the molar composition:

$$Li_{0.5}Cd_xV_zFe_yO_4$$

where:
x is greater than 0.00 and up to 0.05
y is between 2.35 and 2.60
z is between 0.005 and 0.04.

8. A magnetic core having a squareness ratio $R_s$ of at least 0.7 and the molar composition:

$$Li_{0.5}Zn_xV_zFe_yO_4$$

where:
x is greater than 0.00 and up to 0.05
y is between 2.35 and 2.60
z is between 0.005 and 0.04.

9. A magnetic core having a squareness ratio $R_s$ of at least 0.7 and the molar composition:

$$Li_{0.5}Mg_xV_zFe_yO_4$$

where:
x is greater than 0.00 and up to 0.05
y is between 2.35 and 2.60
z is between 0.005 and 0.04.

10. A magnetic core having a squareness ratio $R_s$ of at least 0.7 and having the molar composition:

$$Li_{0.5}Mn_wV_zFe_yO_4$$

where:
w is greater than 0.00 and up to 0.15
y is between 2.35 and 2.60
z is between 0.005 and 0.04.

11. A magnetic core having a squareness ratio $R_s$ of at least 0.7 and having the molar composition:

$$Li_{0.5}V_zFe_yO_4$$

where:
y is between 2.35 and 2.60
z is between 0.005 and 0.04.

12. A method of making a magnetic core having a squareness ratio of at least 0.7 comprising the steps of
calcining in an oxidizing atmosphere at temperatures between 600° and 900° C. a mixture of compounds containing, in the following approximate relative molar proportions, 0.5 mol Li, 0.04 mol Mn, 0.01 mol V, and 2.45 mol Fe, said compounds comprising the constituent metals as oxides thereof or as compounds which yield said oxides during calcining or sintering,
shaping a quantity of said calcined mixture to form a core, and then,
sintering said core at temperatures between 930° and 1190° C. for between 1 and 24 hours in an atmosphere consisting essentially of oxygen gas and between 0 and 99 volume percent of nitrogen gas, and then
cooling said core.

13. A method for preparing a magnetic core comprising
calcining in an oxidizing atmosphere a mixture of compounds containing, in the following relative molar proportions, 0.5 mol Li, 0.0 to 0.15 Mn, 2.35 to 2.60 mol Fe, 0.005 to 0.04 mol V, and 0.00 to 0.05 mol of at least one member of the group consisting of Cd, Zn, and Mg, said compounds comprising the constituent metals as oxides thereof or as compounds which yield said oxides during calcining or sintering,
shaping a quantity of said calcined mixture to form a core,
sintering said core at temperatures between 1050° and 1190° C. for between 1 and 24 hours in an atmosphere which consists essentially of oxygen gas and between 0 and 99 volume percent of at least one neutral gas, and then
cooling said sintered core.

References Cited

UNITED STATES PATENTS

| | | | |
|---|---|---|---|
| 3,223,641 | 12/1965 | Lessoff et al. | 252—62.56 |
| 3,300,411 | 1/1967 | Wickham et al. | 252—62.61 |

FOREIGN PATENTS

| | | |
|---|---|---|
| 524,107 | 11/1953 | Belgium. |
| 1,157,130 | 11/1963 | Germany. |
| 737,284 | 9/1955 | Great Britain. |

TOBIAS E. LEVOW, *Primary Examiner.*

HELEN M. McCARTHY, ROBERT D. EDMONDS, *Examiners.*

UNITED STATES PATENT OFFICE
CERTIFICATE OF CORRECTION

Patent No. 3,372,122                                           March 5, 1968

Howard Lessoff

It is certified that error appears in the above identified patent and that said Letters Patent are hereby corrected as shown below:

Column 3, line 67, for "140°" read -- 1140° --; column 5, line 64, after "proportions" insert a comma.

Signed and sealed this 15th day of July 1969.

(SEAL)
Attest:

Edward M. Fletcher, Jr.                                WILLIAM E. SCHUYLER, JR.
Attesting Officer                                            Commissioner of Patents